(12) United States Patent  
Lee et al.

(10) Patent No.: US 9,429,003 B2  
(45) Date of Patent: Aug. 30, 2016

(54) METHOD FOR RECOVERING METHANE GAS FROM NATURAL GAS HYDRATE BY INJECTING CO2 AND AIR MIXED GAS

(71) Applicant: Korea Advanced Institute of Science and Technology, Daejeon (KR)

(72) Inventors: Huen Lee, Daejeon (KR); Dong Yeun Koh, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 14/328,953

(22) Filed: Jul. 11, 2014

(65) Prior Publication Data

US 2015/0107826 A1  Apr. 23, 2015

(51) Int. Cl.
*E21B 43/16* (2006.01)
*E21B 43/295* (2006.01)
*E21B 43/01* (2006.01)

(52) U.S. Cl.
CPC ............... *E21B 43/164* (2013.01); *E21B 43/01* (2013.01); *E21B 43/295* (2013.01); *E21B 2043/0115* (2013.01); *Y02P 90/70* (2015.11)

(58) Field of Classification Search
None
See application file for complete search history.

(56) References Cited

U.S. PATENT DOCUMENTS

| | | | |
|---|---|---|---|
| 2003/0178195 A1* | 9/2003 | Agee et al. | 166/248 |
| 2004/0200618 A1* | 10/2004 | Piekenbrock | 166/305.1 |
| 2005/0121200 A1* | 6/2005 | Sivaraman | 166/370 |
| 2008/0022594 A1* | 1/2008 | Lee et al. | 48/127.5 |
| 2009/0032248 A1* | 2/2009 | Svoboda et al. | 166/249 |
| 2010/0243245 A1* | 9/2010 | Khinkis et al. | 166/260 |
| 2012/0035405 A1* | 2/2012 | Hester et al. | 585/833 |
| 2012/0227960 A1* | 9/2012 | Pope et al. | 166/250.01 |

OTHER PUBLICATIONS

Beauchamp, Benoit. "Natural gas hydrates: myths, facts and issues." C.R. Geoscience 336 (2004) 751-675.
"Green Car Congress Energy, technologies, issues and policies for sustainable mobility" www.greencarcongress.com, May 2, 2012.

* cited by examiner

*Primary Examiner* — Angela M DiTrani
*Assistant Examiner* — Anuradha Ahuja
(74) *Attorney, Agent, or Firm* — Westerman, Hattori, Daniels & Adrian, LLP

(57) ABSTRACT

Methods for recovering methane gas from natural gas hydrates are provided. A representative method includes the step of adding a gas mixture containing air and carbon dioxide to a natural gas hydrate (NGH), the step of replacing the methane gas with the gas mixture, and the step of decomposition-replacement of methane hydrate.

7 Claims, 3 Drawing Sheets

METHOD FOR RECOVERING METHANE GAS FROM NATURAL GAS HYDRATE BY INJECTING CO2 AND AIR MIXED GAS

BACKGROUND OF THE INVENTION

1. Field of the Invention

The present invention relates to a method for recovering methane gas from natural gas hydrate, more specifically, recovering methane gas through an injection of gas mixture containing air and carbon dioxide oxygen.

2. Description of the Related Art

Natural gas may be an eco-friendly energy source that plays an important role in the energy system which has been maintained without destruction of the natural environment. Natural gas exists as natural gas hydrate in nature, which is a crystalline clathrate hydrate containing hydrocarbons such as a major component of methane, and trace amount of ethane, propane and butane.

Natural gas hydrate deposited worldwide is being noted as an alternative energy source to fossil fuel in the future, since natural gas in a form of natural gas hydrate has been reported to be stored in an amount of about $0.2 \times 10^{15}$ and $7,600 \times 10^{15}$ m3·S. Such amount is expected to cover most of the energy being used worldwide (See: Sloan, Jr. E. D., et al., Nature, 426:353-359, 1998; Lee, S. Y., Holder, G. D., Fuel Processing Technology, 71:181-186, 2001).

In order to use such valuable natural gas hydrate in daily lives, methods for dissociating CH4 gases from the natural gas hydrate should be developed and several approaches have been made in the art as follows: A thermal stimulation sends high temperature water through a pipe and dissociates methane from natural gas hydrate; Depressurization, the vacuum device decreases the pressure between the natural gas hydrate layers to dissociates methane; And injection of inhibitors which dissociates methane from natural gas hydrate by interrupting the condition where the natural gas hydrate can remain stable to change the equilibrium with increased pressure and lowered temperature. (See: Gunn, D. A., et al., Terra Nova, 14:443-450, 2002).

When the above methods are used, however, methane that is most part of the natural gas hydrate gets released unconditionally. Such situation creates the corruption of the natural gas hydrate layers and causes geological problems such as ground subsidence. As a consequence, the ecosystem will be negatively affected. (See: Lelieveld, J., et al., Nature, 355: 339-342, 1992).

Hence, a study to develop the most efficient means to recover methane without dissociating the natural gas hydrate layers is required. The patent the inventors registered Nos 10-0735841 'method for recovering methane gas fro natural gas hydrate' discloses a method to effectively recover methane by reacting the flue gas that contains carbon dioxide and nitrogen with hydrate gas.

However, when the method in the registered patent is being used, one needs to consider that there is a limit to develop deep-sea hydrate gas (a hydrate gas that has the temperature above 10 to 15° C. as a result of geothermal heat) since the safety is low based on the temperature. There has been a problem where it was hard to replace methane with the flue gas at high temperature.

SUMMARY OF THE INVENTION

The present invention provides an effective method for recovering natural gas hydrates in deep-sea, such as the East Sea or underground.

The present invention provides a method for recovering a methane gas from natural gas hydrates in condition with a wider degree of temperature and pressure.

The present invention also provides a method to recover methane inside the natural gas hydrate (NGH) up to 80 to 100% through simultaneous mechanisms for NGH decomposition and CH4-air replacement.

The present invention provides a method to recover methane effectively, and economically from the natural gas hydrate.

The present invention relates to a method for recovering a methane gas from the natural gas hydrate (NGH). The present invention comprises the step of injecting the gas mixture containing carbon dioxide to a natural gas hydrate below the critical methane concentration (CMC), so that the injected gas mixture decompose the natural gas hydrate (NGH) to recover the methane gas.

The present invention comprises the step of injecting the gas mixture containing carbon dioxide to the natural gas hydrate above the critical methane concentration (CMC), so that the injected gas mixture replace the methane gas and decompose the natural gas hydrate (NGH) to recover the methane gas.

The present invention comprises the step of: injecting the gas mixture containing carbon dioxide to a natural gas hydrate below the critical methane concentration (CMC), wherein the injected gas mixture decompose the natural gas hydrate; and maintaining the gas mixture above the CMC in the natural gas hydrate layer to replace the methane gas and decompose the natural gas hydrate (NGH).

The present invention comprises the step of; injecting continuously the gas mixture in natural gas hydrate layer, wherein the gas mixture, replace the methane gas and decompose the natural gas hydrate (NGH) above the critical methane concentration (CMC), wherein the gas mixture decompose the natural gas hydrate falling below the critical methane concentration.

DETAILED DESCRIPTION OF THE INVENTION

Figure 1:
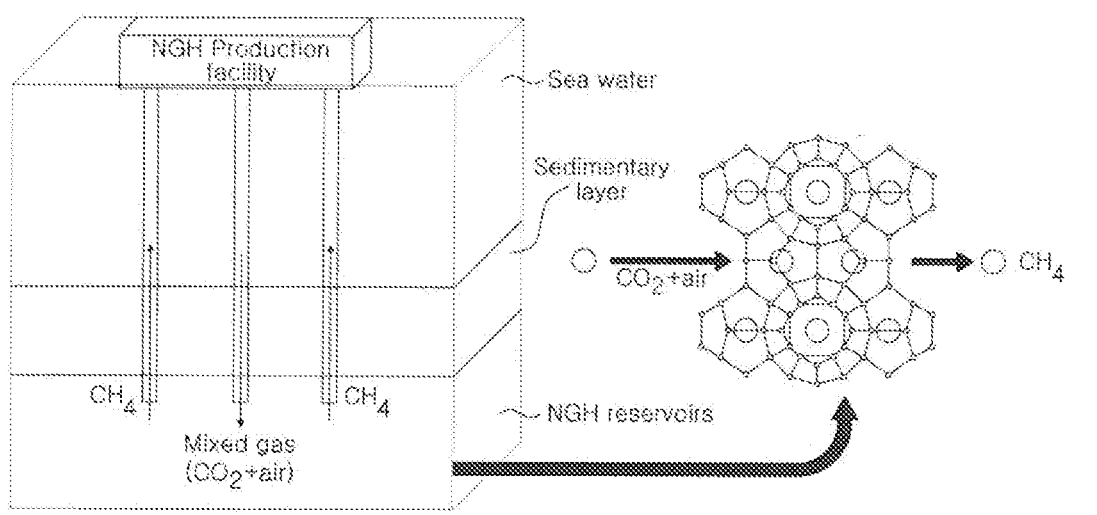
FIG. 1 is a schematic diagram illustrating a method of producing methane by injecting the gas mixture containing air and CO2 gas from natural gas hydrate.

Below, the present invention is further described in detail.
When methane reacts with water at 0° C. and 30 atmospheric pressure, it forms a methane gas hydrate in a cubic structure (cubic structure, Pm3n, 8CH4.46H2O)). Such methane gas hydrate takes most part of the natural gas hydrate layers. (See: Kvenvolden, K. A., Chem. Geol., 71:41, 1988).

The present inventors have made various efforts to develop a method for recovering Methane gas from NGH efficiently without dissociating the natural gas hydrate layers, while focusing on the availability of CO2 gas. Methane gas hydrate is formed by reacting CH4 gas with water at 0° C. under a pressure of over 12 atm. In this connection, it has been reported that carbon dioxide hydrate exists stably under a condition that methane gas hydrate exists in a stable form; while methane gas hydrate cannot exist under a condition that carbon dioxide hydrate exists in a stable form (See: Sloan, Jr. E. D., Clathrate Hydrates of Natural Gases, 2nd ed., Marcel Dekker, New York, 1998).

The present inventors carried out a series of experiments under an assumption that most of CH4 gas can be recovered by adding CO2 gas to NGH under a condition that forms carbon dioxide hydrate, to replace CH4 gas in the NHG with a gas mixture without dissociating the natural gas hydrate layers, by the difference in the partial pressure of CH4 gas in the NGH and the gas mixture, and succeeded in recovering CH4 gas with a recovery rate of 64%. (See: Lee Heun, et al., Angew. Chem. Int. Ed., 42:5048-5051, 2003).

However the recovery rate was considered not reach to the theoretically expected one, therefore, the present inventors further performed experiments to elucidate the cause of the said difference, and found that the said cause was uneven distribution of CH4 gas in the NGH in small cage or large cage.

To explain this in detail, the size of the carbon dioxide molecules being injected are the same, but the methane molecule is generally smaller than carbon dioxide molecules. Therefore, in the large cage of the natural gas hydrate, carbon dioxide replaces methane, but in the small cage, such is not possible. As a consequence, the recovered amount of methane was smaller than anticipated.

The inventors performed various works to master the above problems and increase the quantity of methane being recovered. They discovered that when mixture gas with nitrogen and carbon dioxide is injected in the natural gas hydrate, the amount of methane recovered is far greater than when carbon dioxide is only injected.

The inventors of the invention continued with our study to find the most effective method to recover methane. We found out that when mixture gas containing CO2, more preferably air and CO2 or oxygen and CO2 or oxygen, nitrogen and CO2, is injected in the natural gas hydrate with high pressure, the mixture gas due to the difference of each gas's chemical potential replaced the methane gas inside the natural gas hydrate. The majority of methane gas was automatically dissociated and was able to be recovered.

As well, depending on the temperature of the natural gas hydrate layers, the solid methane hydrate dissociates or decompose to smaller molecules at certain high temperature and makes it possible to recover high amount of methane gas.

Depending on the critical methane concentration (CMC), this technology produces methane gas with simultaneous mechanisms through replace-process (CH4-air replacement) and decompose-process (NGH decomposition).

It is a feature of an example embodiment of the present invention to provide a method for recovering a methane gas from the natural gas hydrate (NGH) which comprises the step of decomposing natural gas hydrate to generate CH4 gases with a gas mixture containing CO2 below the CMC, or the step of replacing CH4 and decomposing the NGH with a gas mixture containing CO2 above the CMC.

A Step of Injecting a Gas Mixture:

The present invention comprises the step of injecting a gas mixture to the natural gas hydrate for generating a methane gas.

The gas mixture can be a gas mixture of air and $CO_2$, $O_2$ and $CO_2$ or $N_2$, $O_2$ and $CO_2$, preferably is a gas mixture of oxygen and air—$CO_2$.

Air is generally made up 79~80% of nitrogen, and 20~21% oxygen. Further, the method makes it possible to reduce costs than using conventional methods because the air is collected directly from the natural gas hydrate (NGH) reservoirs and compressed and injected as a mixture with carbon dioxide and there is no need to transport the infusion another gas. The invention may be widely used in the production of natural gas more effectively.

The gas mixture of air/C02, O2/CO2 or N2/O2/CO2 contains CO2 about 1-90 mol %, preferably 3-90 mol %, more preferably 5-90 mol %.

If the carbon dioxide is less than 3 mol %, the new structure of sII is formed, but if the carbon dioxide is 3 mol % or more, the sI hydrate structure is formed. The sI hydrate structure is to maintain the three-dimensional crystal (cubic) structure, As described below, the three-dimensional structure of which is maintained, it is shown that the gas mixture (air, CO2) replaces and generates methane. The sII hydrate structure has a cubic three-dimensional crystal structure similar to the structure of s1, but the replacing CH4 gas with the gas mixture hardly occurs because of requiring a lower temperature and higher pressure than that of s1 structure.

The gas mixture of air/C02, O2/CO2 or N2/O2/CO2 contains O2 about 5-30 mol % preferably 5-21 mol %. The gas mixture can contain CO2 and air in a molar ratio of 1:10000 to 10000:1, more preferably 1:100 to 100:1, most preferably 1:9 to 6:4. The condition injecting the gas mixture to NGH does not limit that, but is preferably in the temperature range of 0 to 20° C. and in the pressure range of 30 to 250 atm.

The NGH exists in the range of temperature at environmental condition, however the range of temperature can be extended.

The gas mixture can be injected a predetermined amount at the appropriate time in the above mentioned temperature and pressure conditions. For example, it is possible to inject the gas mixture 1 hour to 10 days, preferably 1 hour to 5 days, more preferably 1 to 96 hours, most preferably 24 to 48 hours.

It is possible to put in a great quantity of gas mixture at a time to the natural gas hydrate layer. On the other hand, it can be injected a gas mixture of a constant amount over a few days to a few hours.

In particular, when a large amount of the gas mixture is injected at a time under the critical methane concentration (CMC), the step of decomposition occurs until the critical methane concentration (CMC), and when it has passed the CMC, the steps of decomposition and replacement occur simultaneously.

Furthermore, when a certain quantity of the gas mixture is injected continuously in NGH during the above mentioned time, it occurs decomposition and replacement simultaneously until the CMC, when it has passed the CMC, i.e., under the condition below the CMC, the gas mixture can decompose the NGH.

Next, these steps of composition and replacement phases will be described in detail.

The Step of Decomposition:

The present invention includes the step of decomposing the NHG, which happens due to the chemical potential difference between the gas mixture and NGH (solid).

The term of the above 'decomposition' is considered to dissolve, dissociate, or destruct hydrate three-dimensional crystal structure comprehensively.

To be more precise, the term, 'decomposition' of the invention is shown to be destroyed the crystal structure of the hydrate before it releases methane gas and water by injecting the gas mixture.

When the gas mixture is injected into the natural gas hydrate layers, the decomposition process in an NGH layer proceeds, this decomposition proceeds until the chemical potentials become equal in both solid NGH and gaseous air-methane.

In other words, the NGH is continuously depleted until the chemical potentials of methane in both the solid NGH and gas phases are equal, and right after an arbitrary point, decomposition of methane hydrate stops and replacement of the methane hydrate phase starts. (Left and right areas of the dotted line in Figure).

Figure 2:
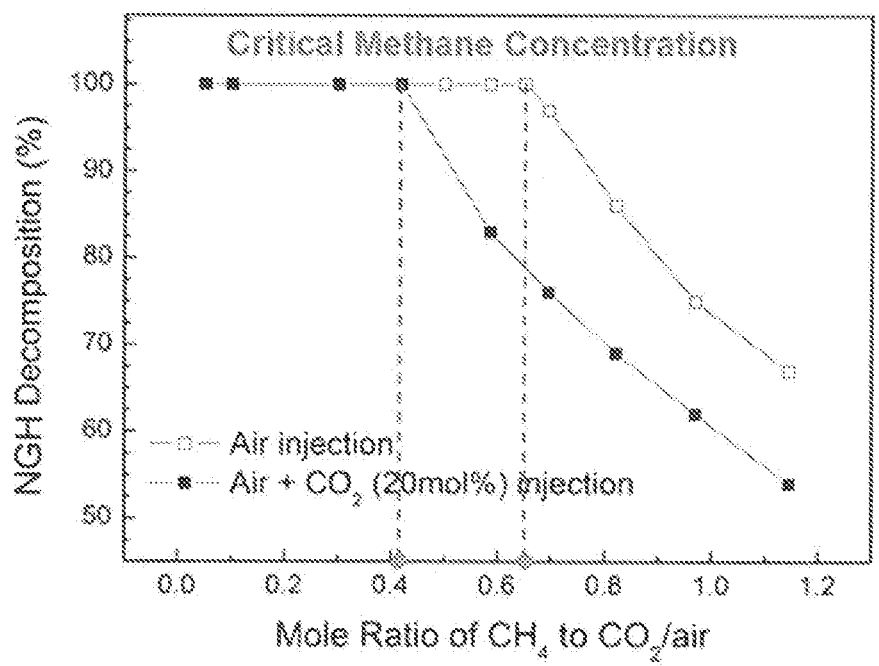
FIG. 2 represents natural gas hydrate (NGH) decomposition (%) and the Critical Methane Concentration (CMC) depending on the molar ratio between CH4 and injected air and CO2/air, at 298K and 200 bars.

FIG. 2 is the decomposition rate of the natural gas hydrate measured by injecting air and air/CO2 (20 mole % CO2) in the 200 bar and 288.15K.

In the present invention, we define the ratio between the methane concentration in hydrate (nCH4) and the injected gas mixture concentration (or CO2/air; $n_{air}$ or $n_{CO2/air}$) at equal chemical potentials as the 'critical methane concentration' (CMC).

The CMC (critical methane concentration) is a concentration that begins the replacement reaction when the decomposition reaction ratio falls below 100% after the gas mixture has been injected.

In other words, when the molar ratio between methane in the NGH and injected gas mixture passes through the CMC, a replacement reaction occurs. (FIG. 2, right part of dotted line).

The CMC can be determined by the amounts of gas mixture, the concentration of carbon dioxide, and the temperature and pressure of the hydrate layer.

Generally, the temperature and pressure of the NGH layer on a specific area can be measured, therefore the CMC can be decided by adjusting amounts of the gas mixture.

For instance, how to set a CMC is described.

A high-pressure reactor having a fixed volume is used. It is possible to adjust the molar ratio between the air and methane ($n_{CH4}/n_{air}$) in the natural gas hydrates according to an initial NGH amount.

At first, the temperature and the pressure of the high-pressure reactor is fixed at 288.15 K and 200 bar to match closely the condition of a specific area, for example, UBGH of the East Sea of Korea.

Each point shown in FIG. 2, means independent experiment. The gas mixture is injected to the high-pressure reactor containing methane hydrate at a time, and leaving the high-pressure reactor for 48-96 hours until the finishing of the reaction.

We can decide to the CMC experimentally by measuring between the weight of methane hydrate injected initially and the concentration of the gas mixture.

The step of decomposition can be obtained by maintaining the amount of gas mixture, more specifically, by maintaining the molar ratio between methane in the NGH and injected gas mixture ($n_{CH4}/n_{air}$) in the CMC or less.

The critical methane concentration changes, depending on the temperature and the pressure of the stratum of NGH.

When the natural gas hydrate melts and breaks down actively below the critical concentration, this becomes the "decomposition hinges zone". When the CH4 in the natural gas hydrate (NGH) is replaced with the gas mixture actively above the critical concentration, this becomes the "replacement hinges zone".

For example, if a large amount of air is injected ($n_{CH4}<n_{air}$), its concentration ($n_{CH4}/n_{air}$) is lower than the CMC, which leads to decompose the methane hydrates. (FIG. 2, left part of dotted line). That is, when it comes to providing continuously the large amount of air, the mole ratio of CH4 in air is maintained below the CMC, and thereby favorably leading to full decomposition of methane hydrates.

On the contrary, if the air or air/CO2 is injected at a rate of critical methane concentration above (a small amount of air is injected), replacement and the decomposition of methane hydrate occur simultaneously. Then the recovery rate of methane can be determined by the relative ratio of the replacement and the decomposition.

Meanwhile, the method is able to apply a temperature or a pressure higher than the pressure or the temperature which determines the critical methane concentration to decompose the natural gas hydrate.

The Step of Replacement

The present invention includes the step of replacing CH4 in the NHG with the gas mixture injected in the critical methane concentration (CMC) or more, wherein the injected gas mixture replaces the methane gas and decompose the natural gas hydrate (NGH). Although the decomposition also occurs in the replacement step, that is, replacement and decomposition occurs at the same time, the replacement occurs principally. Unlike the step of decomposition, the step of replacement is that the methane gas is replaced with gas mixture and thus a new hydrate structure is generated.

As the right area of FIG. 2, the replacement step can be achieved by maintaining the molar concentration ratio between methane in the NGH and injected gas mixture higher than the CMC.

In the step of replacement, a hydrate is not dissolved and the three-dimensional crystal structure (cubic structure) is maintained.

The present invention may lower the critical methane concentration initiated the replacement reaction to increase the carbon dioxide content.

Referring to FIG. 2, when the air was injected into the hydrate alone, the critical methane concentration was about 0.65. As $CO_2$/air (20% mole) was injected, the critical methane concentration was reduced to approximately 0.41.

Generally, When 5 mole % of carbon dioxide is injected into the pure air, the CMC shows a reduction of 10-18% than the case of injecting air alone.

It may be possible to lower the critical concentration of methane by the carbon dioxide addition, as a result, to perform the replacement-dominant NGH recovery.

In the above method, it is possible to drop the critical methane concentration by decreasing the temperature and pressure of the natural gas hydrate layer.

Figure 3:
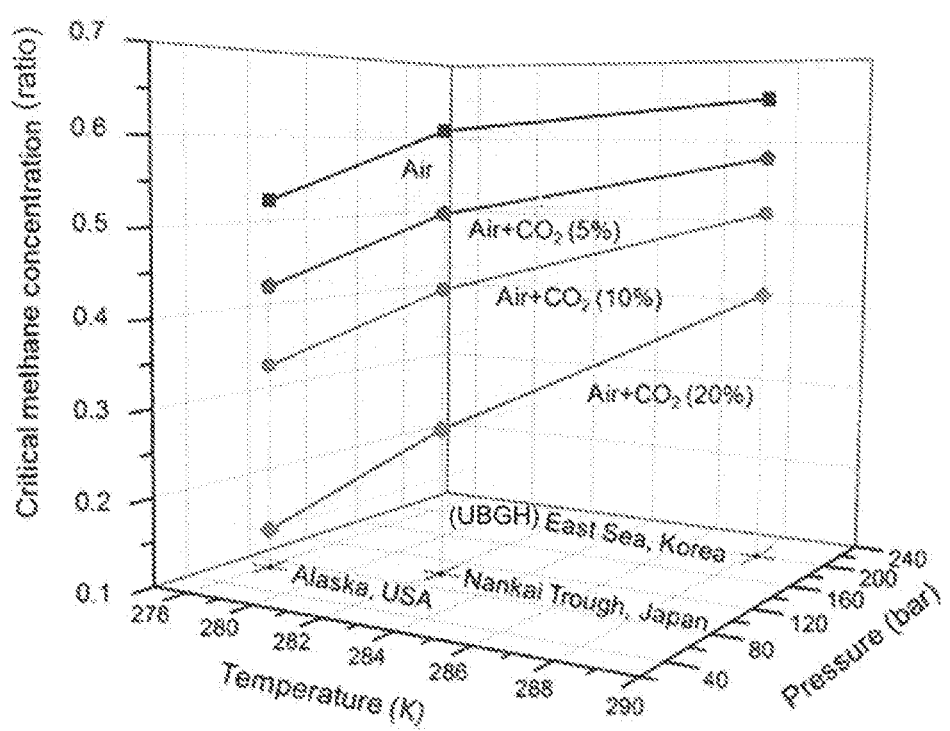
FIG. 3 is the CMC (expressed as a ratio) derived from each experiment, where the air or CO2/air are injected depending on the conditions of pressure and temperature in three NGH production test sites such as the Alaska North Slope, USA, Nankai Trough, Japan, and UlleungBasin (UBGH), Korea.

The CMC shown in FIG. 3 was derived from each experiment, where the air or CO2/air are injected depending on the conditions of pressure and temperature in three NGH production test sites such as the Alaska North Slope (USA), Nankai Trough (Japan) and UlleungBasin (Korea).

In FIG. 3, experiments were carried out by employing the same method as the experiment of FIG. 2. Then, only the critical methane concentration point from any point is displayed in accordance with the temperature and pressure.

To see the degree of NGH decomposition, we first injected pure air into the NGH and found a relatively high CMC in 0.53-0.65. The CMC gradually decreased as the NGH pressure and temperature decreased.

In addition, AS shown in FIG. 3, it can be found that the CMC decreases significantly with increasing the carbon dioxide content.

Referring to FIG. 3, CO2/air mixture gas can produce methane gas by replacement reaction rather than decomposition reaction in most of the concentration conditions as CMC is low at a 5° C. On the other hand, at a high temperature of 15° C. (200 atm) the decomposition hinge zone expands and it is possible to recover methane gas 100% from the hydrate layers due to the simultaneous mechanisms of replacement and decomposition.

Figure 4:
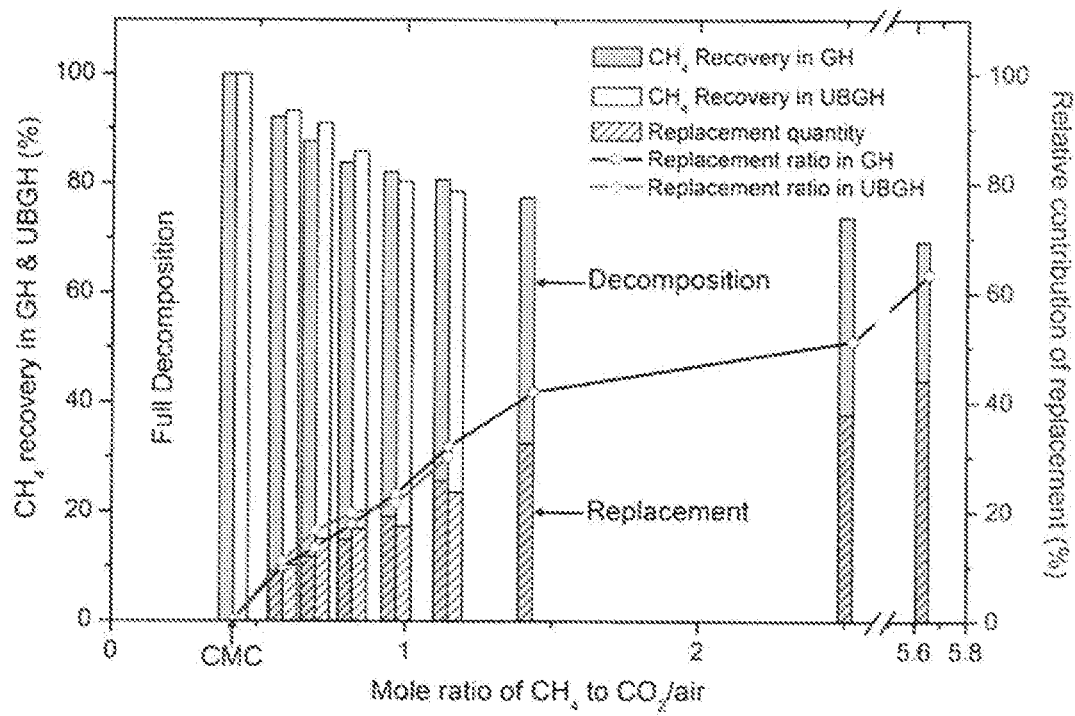
FIG. 4 is obtained by analyzing the decomposition and replacement ratio of the NGH (SI structure) using gas chromatography of gas hydrate (GH) and the natural gas hydrate layer in UBGH through the steps of decomposition and replacement.

FIG. 4 is that we analyzed the decomposition/replacement ratio of the NGH (SI structure) after passing over decomposition and replacement steps using Gas Chromatography (GC).

In FIG. 4, CO2/air injection (20 mole %) was performed at 288.15 K and 200 bar in the NGH layer in UlleungBasin (UBGH) (Korea). The FIG. 4 indicates a CH4 recovery in the right part of the CMC defined FIG. 2, that is, it demonstrates the behavior in the area of replacement and decomposition occurring at the same time quantitatively.

We used a fixed-volume high-pressure reactor, as an experimental apparatus used by FIG. 2.

If the amount of air/CO2 above the critical methane concentration is injected, partial decomposition and replacement occurs at the same time. Referring to FIG. 4, the black line represents the CH4 recovery rate of the replacement in the total CH4 recovery rate.

In addition, the actual real methane hydrate samples collected from the east-Sea was used. And it was confirmed same behavior shown by a red line.

Referring to FIG. 4, when the mole ratio of CH4 to CO2/air is greater than the critical methane concentration, the methane gas production ratio of replacement rather than decomposition increases as the mole ratio increases.

That is, under the conditions below the CMC, first, methane gas is released in the process of dissolving the methane hydrate, and above the CMC, the CO2/air replaced methane gas in natural gas hydrate.

As the mole ratio of CH4 to CO2/air reaches 6, the contribution of replacement in the total CH4 recovery can occupy 60% or more. So, it is possible to achieve a high replacement reaction rate and make a stable production of methane hydrate.

The present invention may improve the methane production efficiency by using the two mechanisms, replacement and decomposition, at the same time. The present invention can be a very reliable method for preserving the gas hydrate layer compared to the method of depressurization.

The gas mixture containing CO2/air can form gas hydrate at a lower pressure and higher temperature than the case of gas mixture containing N2 and CO2.

In other words, because a temperature-pressure phase equilibrium of air hydrate is skewed to the right than such of a phase equilibrium of N2 and it shows the distribution of a more gradual slope, it can be formed air hydrate through replacement reaction stably at the lower pressure and higher temperatures.

The inventors of the present invention understand that the addition of oxygen causes capability of replacement reaction of air hydrate on the conditions a lower pressure and higher temperature than the case of N2 hydrate.

In other words, the range of temperature and pressure inducing a replacement reaction at an actual stratum can be wider by adding an oxygen or air than the case of using nitrogen alone.

Example 1

Water of ultra high purity was obtained from a Millipore purification unit. CH4 and air (O2 21 mole % and N2 balance) gas and CO2/air gas were purchased from the Special Gas Company (Daejeon, Republic of Korea) with a stated minimum purity of 99.95 mole %.

The production process and fluid flow by injecting gas mixture was confirmed by videotape recording through the observation window of high-pressure reactor.

The high-pressure reactor used the example is equipped with two sight quartz windows for visual observation. It had an internal volume of 50 cm3 and a working pressure of 40 MPa. The high-pressure reactor remained in a certain temperature range throughout in the total of experiment process inside a refrigerated water-ethanol mixture bath (RW-2025G; JEIO Tech). The pressure of a high-pressure reactor was measured by a pressure transducer made in Druck with an uncertainty of ±0.01% in a range of 0 to 35 MPa.

In order to eliminate the heating effect of the entering air, it was cooled in the same bath used with the targeted gas hydrates (for 5 h).

The precooled air was injected inside of the reactor using a micro-flow syringe pump (ISCO, model 260D). The volume of methane hydrate filling initially inside of the reactor was adjusted depending on the desired nCH4/Nair or nCH4/nCO2air value.

We were pressurized air or a gas mixture (CO2/air) to the empty area of remaining methane hydrate filled.

Each point shown in FIG. 2 was carried out by an independent experiment and with varying amounts of filling methane hydrate for each point, it was adjusted the ratio to the x-axis. Approximately 48 hours later, by performing the observation using a video camera, we checked the remaining amount of methane hydrate, from this we measured the CMC.

Example 2

The experiments were performed using the setup of the experimental apparatus similar FIG. 3 and FIG. 2. The similar experiments were carried out in accordance with the ratio of carbon dioxide gas to be injected and the pressure and temperature applied to the experiment. It is an embodiment in which a result, showing only the critical methane concentration finally obtained.

In order to match (replicate) the field conditions of Alaska North (GH) in America, the experiment was performed under the conditions of 278.15 K and 70 bar; in order to match the site in the Nankai Trough of Japan, the experiment was performed under the conditions of 282.15 K and 100 bar, and to match the UBGH site in EAST sea, the experiment was performed under the conditions of 288.15 K and 200 bar.

Example 3

Also the embodiment shown in FIG. 4, the experiments were performed using a high pressure reactor, as in the example used in FIG. 2.

The FIG. 4 shows the results of each independent experiment with filling the methane hydrate above the CMC with 5.7 degree ratio based on the information of FIG. 2.

In the case of FIG. 4, based on the information obtained in FIG. 2.

It is the result of up to about 5.7 filled with respective proportions methane hydrate critical methane concentration above and experiments were performed independently.

The experimental method is the same as in FIG. 2, but the method of analysis, different from FIG. 2.

In the case of the third embodiment, after injecting the gas and about 48 hours have elapsed, we opened the reactor under the conditions of liquid nitrogen and took all the remaining sample inside the reactor. The samples were collected and stored in liquid nitrogen for safety.

Through powder X-ray diffraction spectroscopy (PXRD), the ratio of the gas hydrate, which is a ratio table decomposition of gas hydrate remaining in the sample, was calculated. And the gas composition trapped in the remaining hydrates was analyzed using gas chromatography (GC).

The amount based on the results of each experiment was shown as bar graphs the solid line represented the CH4 recovery rate by replacing reaction in the total CH4 amount.

As described above, the present invention permits a recovery of methane gas from the natural gas hydrate in a wider range of temperature and pressure and collection. The method makes it possible to cut costs and be more efficient because the air is piled up immediately from the NGH reservoirs and compressed and is injected as a mix with carbon dioxide and there is no need to transport another infusion gas.

This present invention also allows to decompose the gas hydrate and recover the methane gas yield to gain 100%, depending on the conditions of temperature and absorption, As a consequence, the method of the invention makes it possible to effectively recover (collect) the natural gas hydrate in deep-sea, such as the East Sea, where the gas exists at a high temperature (above 14° C.).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for recovering methane gas from a natural gas hydrate layer, said method comprising:
    injecting a gas mixture comprising carbon dioxide and air into a natural gas hydrate, the natural gas hydrate exhibiting a solid state, above a critical methane concentration, at which chemical potential of methane of the solid natural gas hydrate equals chemical potential of gaseous methane in a vicinity of the natural gas hydrate, such that gaseous methane is decomposed from the natural gas hydrate and, simultaneously, the carbon dioxide from the injected gas mixture replaces the methane in the solid natural gas hydrate to maintain a cubic crystal structure thereof and to free the replaced methane for recovery, at which point chemical potential of gaseous methane equals chemical potential of gaseous methane in a vicinity of the natural gas hydrate;
    wherein continued injecting of the gas mixture into the natural gas hydrate achieves a methane concentration below the critical methane concentration such that gaseous methane is decomposed from the natural gas hydrate without maintaining the cubic crystal structure thereof.

2. The method of claim 1, wherein continued injecting of the gas mixture into the natural gas hydrate to achieve the methane concentration below the critical methane concentration is accomplished by increasing the amount of carbon dioxide in the gas mixture.

3. The method of claim 1, further comprising:
    determining the critical methane concentration by evaluating temperature and pressure of the natural gas hydrate.

4. The method of claim 1, further comprising:
    increasing a temperature or a pressure to change the critical methane concentration.

5. The method of claim 1, wherein the gas mixture contains $CO_2$ at about 1-90 mole %.

6. The method of claim 1, wherein injecting the gas mixture into the natural gas hydrate comprises injecting at a temperature range of 0 to 20° C. and a pressure of 30 to 250 atm.

7. The method of claim 1, further comprising recovering the methane freed from the natural gas hydrate.

* * * * *